United States Patent [19]

Scheibelhoffer et al.

[11] 4,124,570
[45] Nov. 7, 1978

[54] POLY(NEOPENTYL TEREPHTHALATE/TRIMELLITATE)THERMOSETTING RESIN

[75] Inventors: Anthony S. Scheibelhoffer, Norton; Richard E. Meier, Stow, both of Ohio

[73] Assignee: The Goodyear Tire & Rubber Company, Akron, Ohio

[21] Appl. No.: 805,365

[22] Filed: Jun. 10, 1977

[51] Int. Cl.$^2$ ............................................. C08G 63/18
[52] U.S. Cl. ................................... 528/273; 260/860; 528/296
[58] Field of Search .................... 260/75 R, 75 T, 860

[56] References Cited

U.S. PATENT DOCUMENTS

| 3,407,112 | 10/1968 | Karickhoff et al. | 260/75 R X |
| 3,466,348 | 9/1969 | Wiener | 260/860 |

Primary Examiner—Lucille M. Phynes
Attorney, Agent, or Firm—J. P. Ward; J. M. Wallace, Jr.

[57] ABSTRACT

This invention relates to thermosetting copolyesters of terephthalic acid, trimellitic acid and neopentyl glycol units. The compositions can vary from about 95/5 neopentyl terephthalate trimellitate to about 85/15 neopentyl terephthalate trimellitate. They can be cured to form excellent coatings on industrial goods and consumer items such as outdoor furniture.

2 Claims, No Drawings

POLY(NEOPENTYL TEREPHTHALATE/TRIMELLITATE)THERMOSETTING RESIN

This invention relates to thermosetting polyester coating resin and to products of such resin.

Restrictions on pollution have reduced the extent of use of solvent based coatings and have required the development of new types of coatings that do not pollute the atmosphere. A resin is required which may be compounded to give an impervious, smooth, glossy coating that has good resistance to weathering, abrasion and solvents.

According to the present invention a series of thermosetting polyester resins has been found that have the above properties and may be compounded with pigments, flow agents and curing agents. These resins are copolyesters of neopentyl terephthalate trimellitate containing neopentyl terephthalate: trimellitate units in the ratio of 85:15 to 95:5.

For convenience in discussing the preparation of the polymers of the invention the process of making them is divided into three stages. Stage 1 is the initial glycolysis reaction in which neopentyl glycol is reacted with dimethyl terephthalate to prepare neopentyl terephthalate. Stage 2 is the esterification and polymerization portion of the process. In this stage the product from stage 1 is polymerized to an intrinsic viscosity of about 0.075 to 0.095 and then reacted with trimellitic anhydride and further polymerized to form a polymeric product having an intrinsic viscosity in the range of from about 0.160 to 0.210.

Very shortly after transfer of the product from the stage 1 vessel to the stage 2 vessel, the product from stage 1 was polymerized to an intrinsic viscosity of about 0.09 by reducing the pressure in the second vessel to about 40 millimeters of mercury pressure and maintaining this pressure until the desired intrinsic viscosity was attained.

Then the pressure was raised to atmospheric pressure, trimellitic anhydride was added and esterified with free hydroxyl groups of the low polymer blocks of neopentyl terephthalate already prepared. The amount of trimellitic anhydride reacted is controlled so that the desired Tg and acid number are obtained in the polymer.

The trimellitic anhydride is reacted at atmospheric pressure for a period of about 20 minutes, then the mixture was polymerized under reduced pressure at 220° C. until the final point was reached. Then the reaction vessel was cooled and the product discharged.

First Stage 112 pounds of dimethyl terephthalate, 86.78 pounds of neopentyl glycol and 0.056 pound of catalyst comprising dibutyl tin oxide were charged into the reactor. The catalyst was added when the internal (batch) temperature reached 180° C. Agitation was started when the batch was molten. The column head temperature was controlled at 54 to 70° C. with the lower half of the column and liquid return line being heated to prevent freezing the glycol rich reflux.

When the head temperature rose, indicating the reaction had begun the oil temperature in the vessel jacket was raised to 215 to 218° C. This temperature was maintained allowing the reaction to complete at atmospheric pressure to at least 90 percent conversion. The internal temperature was controlled so that it did not exceed 215° C. After a reaction time of about 150 minutes the batch was transferred to the second stage reactor through a fine pore size filter.

Second Stage

The second stage vessel jacket oil temperature was set at 220 to 225° C. until the batch was transferred into the second stage vessel. The oil temperature then was set to about 240 to 260° C. and adjusted to provide the desired internal temperature. Successful second stage processing was carried out over a range of 220 to 260° C. internal temperature as follows:

As soon as the transfer to stage 2 is complete a vacuum cycle is initiated at about 15 mm/min. from atmosphere to about 100 mm Hg. The rate was then changed to 8 mm/min. until a base pressure of about 40 mm Hg was reached. This pressure was maintained until the molecular weight increased to a corresponding intrinsic viscosity of 0.09. This point may be obtained prior to completion of the vacuum cycle depending upon the internal temperature and glycol/ester ratio utilized. The 40 mm Hg base pressure is the practical limit of the reaction rate to the controlled point of trimellitic anhydride addition.

When the trimellitic anhydride addition point was reached the vessel was pressured to atmospheric pressure and 12.3 pounds of trimellitic anhydride was charged to the batch. Addition of this flaked material was through a solids charge bomb equipped with a nozzle to direct the charge into the agitator vortex. This prevents localized high concentrations of trimellitic anhydride which may tend to crosslink rapidly. The batch was agitated under a nitrogen atmosphere about 20 minutes. During this time the anhydride was reacted into the polymer.

When the 20 minute mixing cycle was complete a second vacuum cycle was initiated. The pressure was reduced at 25 mm/min. to about 100 mm Hg. The rate was then reduced to 15 mm/min. until desired base pressure was obtained. This pressure ranged from 1 to 100 mm Hg and was chosen with an internal temperature of 200° C. Polymerization proceeded until the reaction end point was reached.

The pressure was then raised rapidly to about one-half atmosphere and the batch transferred to the cooling vessel which was held at atmospheric pressure. A fine pore size filtration was employed during the transfer.

Third Stage (Cooling and Finishing Operations)

The cooling vessel jacket temperature was set at about 125° C. when the batch was transferred in. The batch was cooled with mild agitation to about 150° C. at a vessel pressure range of 500 to 760 mm Hg. The vessel jacket was regulated to control the product temperature at 150° C. for discharge. The product was discharged, cooled and flaked.

The invention has been illustrated by showing the preparation of a 90/10 neopentyl terephthalate/trimellitate copolymer. Other copolymers in the range of from 95/5 to 85/15 can similarly be prepared such as the 95/5 neopentyl terephthalate/trimellitate, 93/7, 88/12 and 85/15 can be prepared. In these copolymers neopentyl glycol forms 100 percent of the glycol units; terephthalic acid and trimellitic acid are in the ratios indicated such as 95/5, 90/10, 85/15 and so on.

Various catalysts can be used. Representative examples of catalysts useful in the invention are dibutyl tin oxide and sodium acetate, stannous octoate, butyl hydroxy tin chloride, zinc acetate and titanium glycollate.

Active curing agents can be used. Representative examples are CR-10 a caprolactam blocked isophorone diisocyanate and melamines such as American Cyanamid Cymbel 300.

Intrinsic viscosities of the resins as reported in this specification were determined with a Bendix model 1800 viscoson vibrating reed viscometer. This instrument was calibrated using samples measured for intrinsic viscosity in solution in 60/40 phenol-tetrachloroethane mixed solvent (0.3 g per 25 ml of solvent) at 30.0° C.

The resins of the invention can have a range of properties. The Tg should be from about 55 to 80. The acid number can vary from about 10 to 30, preferably less than 15. The hydroxyl number can vary from about 20 to 70 and is preferably in the range from about 30 to about 60.

The resins of the invention are useful as industrial coating resins for appliances and as decorative finishes on outdoor furniture and similar applications. The resins may be compounded with pigments, flow agents and curing agents. An excellent formulation comprises about 82 parts of the 90/10 copolymer, 50 parts of $TiO_2$, 1 part of flow control and 10 parts of a curing agent such as CR 10.

The resins make excellent powder coating resins and can be used in various types of equipment designed for the application of powders.

While certain representative embodiments and details have been shown for the purpose of illustrating the invention it will be apparent to those skilled in this art that various changes and modifications may be made therein without departing from the spirit or scope of the invention.

What we claim is:

1. Poly(neopentyl terephthalate/trimellitate) thermosetting copolyester resin comprising from 95/5 to 85/15 neopentyl terephthalate/trimellitate formed of neopentyl polyester having an intrinsic viscosity of from about 0.077 to 0.120 (determined by a vibrating reed viscometer) joined by units of trimellitic anhydride, the copolymer having a hydroxyl number of from 30 to 50, an acid number of less than 15, an intrinsic viscosity of about 0.185 and a Tg of not less than 60° C.

2. The method of making the copolymer of claim 1 which comprises reacting dimethyl terephthalate with neopentyl glycol to form a low molecular weight polymer having an intrinsic viscosity of from 0.077 to 0.120 and then reacting this polymer with trimellitic anhydride and condensing the product to form a polymer with a hydroxyl number of from 30 to 50, an acid number of less than 15, an intrinsic viscosity of about 0.185 and a Tg of not less than 60° C.

* * * * *